June 16, 1953     H. W. GEHM ET AL     2,642,393
NEUTRALIZATION OF LIQUIDS
Filed Jan. 29, 1949     2 Sheets-Sheet 1
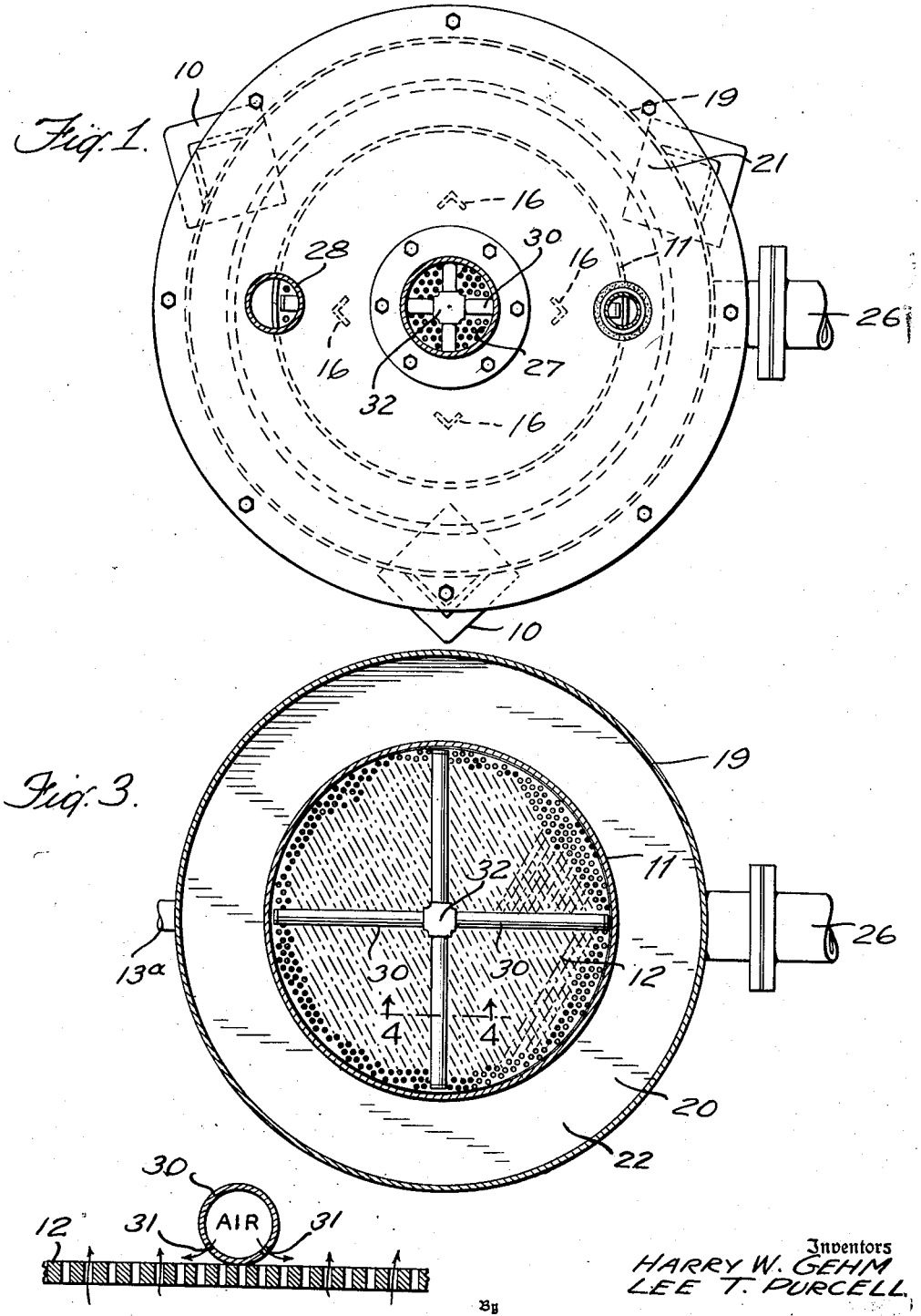
Inventors
HARRY W. GEHM
LEE T. PURCELL
George T. Gill
Attorney

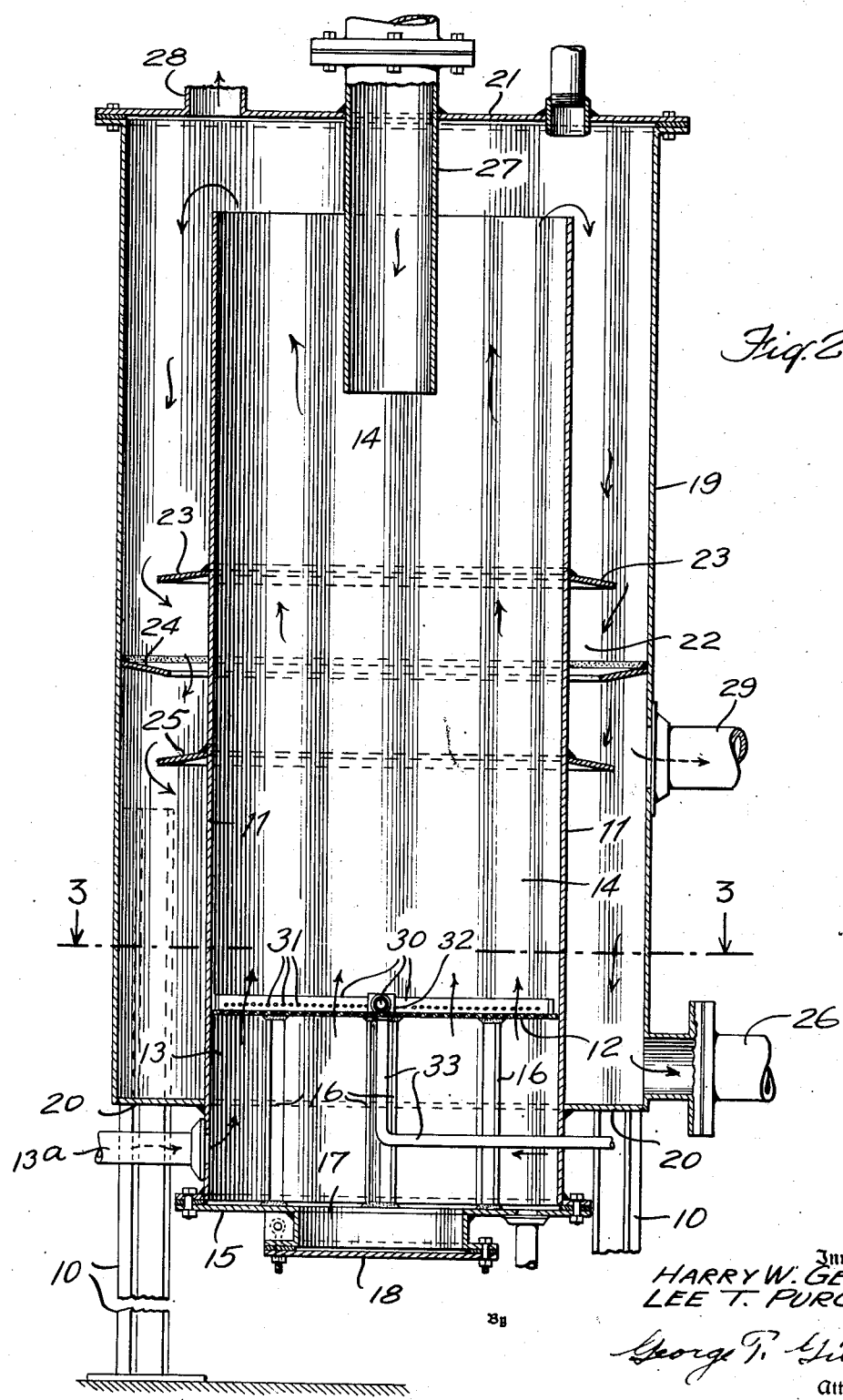

Patented June 16, 1953

2,642,393

UNITED STATES PATENT OFFICE 2,642,393

NEUTRALIZATION OF LIQUIDS

Harry W. Gehm, Metuchen, and Lee T. Purcell, Pompton Lakes, N. J., assignors to Limestone Products Corporation of America, Newton, N. J., a corporation of New Jersey Application January 29, 1949, Serial No. 73,566

2 Claims. (Cl. 210—2)

The invention herein disclosed relates to the neutralization of liquids and more particularly to a neutralizing unit for a plant or system for the neutralization of liquids, and comprehends a method for effecting the neutralization of liquids.

As an incident of certain manufacturing processes, there results a waste product that may be alkaline or acid. Such waste products frequently pose a problem in respect of their disposal. In many instances such waste must be neutralized before being discharged into adjacent streams or sewers.

The primary object of this invention is to provide a neutralizing unit for a plant or system of the kind mentioned, and a method, by which industrial waste products may be effectively and economically neutralized.

The foregoing object and certain advantages that will hereinatfer appear are realized in the neutralizing unit illustrated in the accompanying drawings and the method of this invention, both of which are described in detail below.

The drawings include:

Fig. 1 which is a top plan view of a neutralizing unit embodying the invention;

Fig. 2 which is an axial, sectional elevation of the neutralizing unit;

Fig. 3 which is a transverse section of the neutralizing unit taken on the line 3—3 of Fig. 2; and Fig. 4 which is a fragmentary sectional elevation taken along the line 4—4 of Fig. 3.

The arrangement illustrated in the accompanying drawings is especially suitable for the neutralization of acid waste. In general, the arrangement effects an up-flow of acid waste through a filter bed of a neutralizing agent of solid particles that are maintained in suspension and continually agitated. For most acid wastes, a filter bed of limestone satisfactorily effects the neutralization of the waste liquid. By effecting an up-flow through the filter bed the particles of the neutralizing agent, limestone, for example, constituting the filter bed are to some extent suspended and agitated so that the entire surface of each of the particles comes into contact with the liquid waste passing through the filter bed. In addition, air is utilized to effect a further suspension and agitation of the particles. In this way, the velocity of the up-flow of the waste liquid may be kept relatively low with a consequent better neutralization.

The particular neutralizing unit disclosed in the drawings includes stanchions 10, four in number angularly disposed through ninety degrees, for supporting the unit. The unit itself consists of an inner cylinder 11 divided, transversely, by a perforated plate 12, into a receiving compartment 13 and a neutralizing compartment 14. A bottom plate 15 closes the bottom of the cylinder 11, and uprights 16, secured to the bottom plate 15 and the perforated plate 12, serve to support the perforated plate. Desirably, there is provided an inspection opening 17 through the bottom plate 15 that is normally closed by a removable plate 18. An inlet 13a for liquid to be neutralized is provided in the side wall of the cylinder and opens into the receiving compartment 13. The cylinder 11 is open at its upper end so that the waste liquid may freely overflow; it is desirably lined with a rubber lining.

Surrounding the cylinder 11, there is a cylinder 19. This cylinder has an annular bottom wall 20, extending between the bottom edge thereof and the cylinder 11. The upper edge of the cylinder 19 extends above the upper edge of the cylinder 11 and has a top closure plate 21. The annular space 22, between the cylinders 11 and 19, constitutes a down-flow passage for effluent or waste liquid as it overflows the edge of the cylinder 11.

Within this passage, through which the effluent flows downwardly, there are a series of circumferential baffles 23, 24 and 25 spaced apart, vertically. The baffles 23 and 25 extend outwardly from the outer wall of the cylinder 11 to a point or circle slightly beyond the mean diameter of the down-flow passage, that is, the baffle is slightly wider than half the width of the passage 22. The baffle 24 extends radially inwardly from the inner wall of the cylinder 19; it is positioned, vertically, between the baffles 23 and 25, and it is slightly wider than half the width of the passage 22. These baffles cause a cascading of the effluent to permit scrubbing of gases carried thereby. After flowing down the passage, the effluent passes through a discharge outlet 26, at the bottom of the passage.

In the center of the closure plate 21, there is an opening through which a conduit 27 extends. The conduit 27 extends into the cylinder 11, as shown. Through this conduit, limestone is introduced into the cylinder 11. The limestone, which forms the filter bed, is supported by the perforated plate 12. A gas opening 28 is also provided through the plate 21, and this opening is connected to the intake side of an exhaust fan (not shown). The outlet of the exhaust fan is connected by a conduit (not shown) to the outside atmosphere. Desirably, there is provided an overflow outlet 29 communicating with the annular space 22 at about the level of the baffle 25. This outlet is connected to discharge.

Resting on the perforated plate 12, there is an arrangement for introducing streams or jets of air and water in contact with the surface of the plate 12. This arrangement consists of pipes or conduits 30 (shown as four in number) arranged radially, angularly spaced through ninety degrees and connected together at the center of the plate 12. Each of the pipes 30 is closed at its outer end and is provided along its under side with longitudinally and angularly spaced opening 31 for directing streams of air or water, under pressure, along the surface of the plate 12. The central fitting 32, connecting the pipes 30 together, is connected to a supply pipe 33 which extends into the chamber 13 and through the side wall thereof. The pipes 30, fitting 32 and pipe 33 are made of acid resisting material.

In operation, limestone is introduced into the neutralizing chamber 14 through the conduit 27, preferably from the hopper (not shown) connected to the conduit 27. Sufficient limestone is introduced to form a bed on the plate 12 of a depth of from one to four feet. The smaller the size of the particles of limestone the greater the area presented and the more effective the bed. Very small particles, however, tend to wash out if high rates of flow are employed. The height of the cylinder 11, or rather the neutralizing chamber 14, should be at least twice the depth of the bed of limestone because under certain conditions of operation the bed expands about fifty percent, and gas bubbles, at times, carry the limestone particles higher than the expanded level of the limestone bed.

The acid waste to be neutralized is delivered to the inlet 13a of the receiving compartment 13 by a pump (not shown). If necessary, dilution water may be added to the waste before it is pumped into the chamber 13. The liquid is delivered to the chamber 13 under sufficient pressure to cause it to flow up through the perforated plate 12, the bed of limestone and over the edge of the neutralizing chamber 14, at the desired or predetermined rate of flow in gallons per square foot of the bed per minute. During this up-flow of the waste, air under pressure is admitted through the pipes 30 and expands the bed of limestone, effecting as it were, a suspension and agitation of the limestone particles. Because of this condition all surfaces of each particle of the bed are continuously in scrubbing contact with the waste liquid. By the use of the air, a lower velocity of the waste is feasible and a more efficient neutralization is effected. Intermittently, the air is cut off and water under pressure is delivered to the pipes 30. The streams of water serve to dislodge particles from the plate 12 and keep the plate perforations clear.

As the effluent overflows the upper edge of the neutralizing chamber 14, it falls, by gravity, through the annular passage 22. In falling through the passage 22, the effluent is cascaded by the baffles 23, 24 and 25. By virtue of the cascading, the effluent is spread in a thin, porous film. Eventually, the effluent passes through the outlet 26 and is discharged into an adjacent stream or into the sewer.

During the operation of the system, the exhaust fan, connected to the outlet 28, is continuously operating. The neutralization of the acid waste gives off carbon dioxide which is carried off by the exhaust fan. In addition, the exhaust fan draws air through the discharge outlet 26. This air moving upwardly through the descending, cascading effluent removes the gases carried thereby, such as carbon dioxide, and reduces the carbonic acidity of the effluent. The gases so removed by the exhaust fan are removed through the outlet 28 and discharged to the outside atmosphere.

From the above description of the embodiment of the invention illustrated in the drawing and the description of the method of the invention, it will be apparent to those skilled in the art that by this invention there is provided a neutralizing unit for a neutralization plant and a method of neutralizing industrial waste that are efficient in operation, comparatively inexpensive to construct and maintain and that require a minimum of supervision. It will be understood that the method may be either continuous or intermittent dependent upon whether the manufacturing process from which the waste results is a continuous or batch process.

While the neutralization of acid waste has been described above, it will be obvious that the plant and process may be used for the neutralization of alkaline waste, a proper change being made in the character of the filter bed. It will also be obvious that various changes may be made by those skilled in the art in the steps of the method and the details of the neutralizing unit described above within the principle and scope of the invention as expressed in the appended claims.

We claim:

1. A neutralizing unit for a plant for the neutralization of waste liquid which unit comprises in combination, an upright cylinder, a perforated transverse wall within the cylinder for supporting a bed of solid particles of a neutralizing material and dividing the cylinder into a neutralizing chamber and a liquid receiving chamber below the neutralizing chamber, the height of the cylinder above the transverse, perforated wall being at least twice the depth of the bed of neutralizing material required, an inlet to the cylinder below the perforated wall, means for introducing air under pressure below the bed of neutralizing material for effecting a suspension and agitation of the neutralizing material, another cylinder of larger diameter surrounding the first mentioned cylinder and effecting a passage for the effluent overflowing the first mentioned cylinder, oppositely extending baffles between the cylinders for cascading the effluent flowing downwardly between the cylinders, and means for drawing air upwardly between the cylinders.

2. The method of neutralizing liquid waste which method includes the steps of causing the waste liquid to flow upwardly through a bed of neutralizing material consisting of solid particles, effecting a suspension and agitation of the particles of the neutralizing materials during the passage of the liquid therethrough by introducing a fluid under pressure and in a plurality of streams at the base of the bed of the neutralizing material, effecting a down-flow of the effluent issuing from the neutralizing material, cascading the down-flow, and drawing air upwardly through the cascading effluent.

HARRY W. GEHM.
LEE T. PURCELL.

References Cited in the file of this patent

UNITED STATES PATENTS

| Number | Name | Date |
|---|---|---|
| 758,367 | Joseph | Apr. 26, 1904 |
| 1,189,114 | Irwin | June 27, 1916 |
| 1,248,329 | Hughes | Nov. 27, 1917 |
| 1,765,424 | Hageman et al. | June 24, 1930 |
| 2,352,901 | Klein | July 4, 1944 |
| 2,428,418 | Goetz et al. | Oct. 7, 1947 |

FOREIGN PATENTS

| Number | Country | Date |
|---|---|---|
| 17,650 | Great Britain | of 1887 |
| 259,385 | Great Britain | Oct. 14, 1926 |
| 147,652 | Germany | Jan. 28, 1904 |